(12) United States Patent
Peng et al.

(10) Patent No.: US 11,698,316 B2
(45) Date of Patent: Jul. 11, 2023

(54) PRESSURE SENSOR, MANUFACTURING METHOD THEREOF, PRESSURE SENSING METHOD AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Rui Peng, Beijing (CN); Xiang Wan, Beijing (CN); Zhijie Ye, Beijing (CN); Yue Hu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 608 days.

(21) Appl. No.: 16/649,502

(22) PCT Filed: May 21, 2019

(86) PCT No.: PCT/CN2019/087699
§ 371 (c)(1),
(2) Date: Mar. 20, 2020

(87) PCT Pub. No.: WO2019/223666
PCT Pub. Date: Nov. 28, 2019

(65) Prior Publication Data
US 2020/0309629 A1 Oct. 1, 2020

(30) Foreign Application Priority Data
May 22, 2018 (CN) .......................... 201810494408.7

(51) Int. Cl.
*G01L 11/02* (2006.01)
*G02F 1/1333* (2006.01)
*G06F 3/041* (2006.01)

(52) U.S. Cl.
CPC .......... *G01L 11/02* (2013.01); *G02F 1/13338* (2013.01); *G06F 3/0414* (2013.01)

(58) Field of Classification Search
CPC ........ G01L 1/24; G01L 11/02; G02F 1/13338; G06F 3/0414
(Continued)

(56) References Cited

U.S. PATENT DOCUMENTS

2010/0003502 A1 1/2010 Nashiki et al.
2010/0188796 A1 7/2010 Bulovic et al.
(Continued)

FOREIGN PATENT DOCUMENTS

CN 102298985 A 12/2011
CN 102769109 A 11/2012
(Continued)

OTHER PUBLICATIONS

Translation CN-106129098 Yu (Year: 2016).*
(Continued)

*Primary Examiner* — Alexander A Mercado
*Assistant Examiner* — Monica S Young
(74) *Attorney, Agent, or Firm* — Myers Bigel, P.A.

(57) ABSTRACT

A pressure sensor, a manufacturing method thereof, a pressure sensing method and a display device are provided. The pressure sensor includes a first electrode, at least two supports on a first surface of the first electrode, an elastic composite electrode on a side of the supports facing away from the first electrode. Two adjacent supports of the supports, the elastic composite electrode and the first electrode define a compressible space, and the at least two supports are formed of an insulating material. The pressure sensor further comprises a second electrode on a side of the elastic composite electrode facing away from the first electrode and an organic light emitting layer between the first electrode and
(Continued)

the second electrode, the organic light emitting layer being in contact with one of the first electrode and the second electrode. The pressure sensor has advantages of low power consumption, fast response and high sensitivity.

18 Claims, 4 Drawing Sheets

(58) Field of Classification Search
USPC .......................................................... 73/705
See application file for complete search history.

(56) References Cited

U.S. PATENT DOCUMENTS

| | | | |
|---|---|---|---|
| 2011/0080368 A1* | 4/2011 | Lee .................. | G06F 3/045 29/846 |
| 2014/0008657 A1* | 1/2014 | Lu .................. | H01L 51/003 257/59 |
| 2015/0062064 A1* | 3/2015 | Shih .................. | G06F 3/0443 345/174 |
| 2015/0177078 A1* | 6/2015 | Dumitru .............. | H01L 27/20 73/777 |
| 2017/0010704 A1* | 1/2017 | Chen .................. | G02F 1/136286 |
| 2017/0052073 A1 | 2/2017 | Dani et al. | |
| 2019/0067391 A1 | 2/2019 | Li et al. | |

FOREIGN PATENT DOCUMENTS

| | | | | | |
|---|---|---|---|---|---|
| CN | 103713761 | A | | 4/2014 | |
| CN | 104679359 | A | | 6/2015 | |
| CN | 104679359 | A | * | 6/2015 | ........... G06F 3/0414 |
| CN | 205038626 | U | | 2/2016 | |
| CN | 106020540 | A | | 10/2016 | |
| CN | 106129098 | A | | 11/2016 | |
| CN | 106129098 | A | * | 11/2016 | ............... G09F 9/33 |
| CN | 206249279 | U | | 6/2017 | |
| CN | 107290084 | A | | 10/2017 | |
| CN | 107394052 | A | | 11/2017 | |
| CN | 107421681 | A | * | 12/2017 | ............. G01L 11/02 |
| CN | 108760111 | A | | 11/2018 | |
| CN | 112414595 | A | * | 2/2021 | |
| EP | 2889596 | A1 | | 7/2015 | |
| KR | 20160145236 | A | * | 12/2016 | |

OTHER PUBLICATIONS

Translation CN-107421681 Zhou (Year: 2017).*
Translation KR-20160145236 Cho (Year: 2016).*
Translation CN-104679359 Shi (Year: 2015).*
First Office Action and English language translation, CN Application No. 201810494408.7, dated Jun. 3, 2019, 11 pp.
International Search Report and English language translation, International Application No. PCT/CN2019/087699, dated Jul. 25, 2019, 7 pp.

* cited by examiner

PRESSURE SENSOR, MANUFACTURING METHOD THEREOF, PRESSURE SENSING METHOD AND DISPLAY DEVICE

CROSS REFERENCE TO RELATED APPLICATIONS

The present application is a 35 U.S.C. 371 national stage application of a PCT International Application No. PCT/CN2019/087699, filed on May 21, 2019, which claims the benefits of priority of Chinese patent application No. 201810494408.7 filed on May 22, 2018, the disclosures of which are incorporated herein by reference in their entireties.

TECHNICAL FIELD

This disclosure relates to the field of sensing technologies, and specifically to a pressure sensor, a manufacturing method thereof, a pressure sensing method and a display device.

BACKGROUND ART

Pressure sensor is one of the most frequently used sensors in industrial practice, and it is widely used in various industrial automatic control environments, including water conservancy and hydropower, railway transportation, intelligent buildings, production automatic control, aerospace, military projects, petrochemical industry, oil wells, electricity supply, ships, machine tools, pipelines and many other industries.

However, the existing pressure sensors and pressure sensing methods still need improvement.

SUMMARY

In an aspect of the disclosure, a pressure sensor is provided. The pressure sensor comprises a first electrode, at least two supports on a first surface of the first electrode, an elastic composite electrode on a side of the at least two supports facing away the first electrode. Two adjacent supports of the at least two supports, the elastic composite electrode and the first electrode define a compressible space, and the at least two supports are formed of an insulating material. The pressure sensor further comprises a second electrode on a side of the elastic composite electrode facing away the first electrode, and an organic light emitting layer between the first electrode and the second electrode, the organic light emitting layer being in contact with one of the first electrode and the second electrode.

In some embodiments, the elastic composite electrode comprises a conductive sublayer on the side of the supports facing away the first electrode and a conductive elastic sublayer on a side of the conductive sublayer facing away the supports, the conductive elastic sublayer being a planar structure.

In some embodiments, the pressure sensor comprises a substrate, the substrate is attached to a second surface of the first electrode opposite to the first surface, an orthogonal projection of the conductive elastic sublayer on the substrate covers an orthogonal projection of the compressible space on the substrate.

In some embodiments, an orthogonal projection of the organic light emitting layer on the substrate comprises an overlapping region with the orthogonal projection of the compressible space on the substrate.

In some embodiments, the conductive sublayer comprises a plurality of conductive blocks in one-to-one correspondence with the at least two supports and separated by the compressible space.

In some embodiments, an orthogonal projection of each conductive block of the plurality of conductive blocks on the substrate falls within an orthogonal projection of a corresponding support on the substrate.

In some embodiments, the conductive sublayer further comprises: a first metal layer above the at least two supports, and a second metal layer on a side of the first metal layer facing away the supports.

In some embodiments, the conductive elastic sublayer comprises an elastic layer and a third metal layer stacked on the conductive sublayer, the elastic layer comprises a conductive component.

In some embodiments, the elastic layer comprises at least one selected from a group consisting of a conductive rubber and an elastic polymer containing conductive particles, the third metal layer comprises silver nanowires.

In some embodiments, the organic light emitting layer comprises a plurality of sub-light emitting layers in an array.

In some embodiments, the organic light emitting layer is between the elastic composite electrode and the second electrode.

In some embodiments, the organic light emitting layer is arranged on a side of the first electrode facing the compressible space, and the organic light emitting layer comprises a plurality of sub-light emitting layers in an array.

Another embodiment of the disclosure provides a display device, comprising the pressure sensor according to any one of the foregoing embodiments.

Yet another embodiment of the disclosure provides a method for manufacturing the pressure sensor according to any one of the foregoing embodiments. The elastic composite electrode comprises a conductive sublayer and a conductive elastic sublayer arranged in a stack, the conductive elastic sublayer is a planar structure, wherein the method comprises: forming the conductive sublayer on a side of the at least two supports facing away the first electrode, and forming the conductive elastic sublayer on a substrate, peeling and transferring the conductive elastic sublayer to the conductive sublayer.

In some embodiments, the forming the conductive sublayer comprises: fabricating a first metal layer on the side of the at least two supports facing away the first electrode, and forming a second metal layer on a side of the first metal layer facing away the supports. The forming the conductive elastic sublayer comprises: attaching an elastic layer comprising a conductive component to the substrate; coating and drying a third metal layer on a side of the elastic layer facing away the substrate, and peeling and transferring the elastic layer and the third metal layer to the second metal layer.

Still another embodiment of the disclosure provides a method for sensing a pressure with the pressure sensor according to any one of the foregoing embodiments, the method comprising: applying an electric signal to the first electrode and the second electrode to generate a voltage difference between the first electrode and the second electrode; detecting a light emitting parameter of the organic light emitting layer under the pressure, the light emitting parameter comprising at least one selected from a group consisting of brightness, light emitting area and current efficiency of the organic light emitting layer, and determining a pressure value of the pressure based on the light emitting parameter.

In some embodiments, the determining the pressure value of the pressure based on the light emitting parameter comprises: applying different pressures with known pressure values to the pressure sensor, detecting the light emitting parameter of the organic light emitting layer under the different pressures with known pressure values; plotting a standard pressure curve, the standard pressure curve indicating a relationship between the light emitting parameter and the pressure value of the pressure applied to the pressure sensor, and detecting the light emitting parameter of the organic light emitting layer under an unknown pressure, and determining the pressure value of the unknown pressure based on the standard pressure curve.

BRIEF DESCRIPTION OF DRAWINGS

The above and/or additional aspects and advantages of the disclosure will become apparent and easy to understand from the description of the embodiments with reference to the following drawings, where.

DETAILED DESCRIPTION OF EMBODIMENTS

Figure 1:
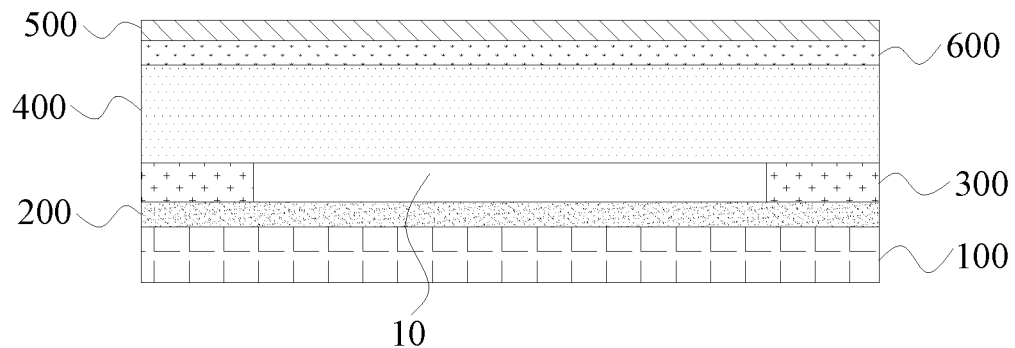
FIG. 1 is a partial longitudinal section view of a pressure sensor according to an embodiment of this disclosure.

The embodiments of this disclosure will be described in detail, and examples of the embodiments are shown in the drawings, where same or similar signs indicate same or similar elements or elements having same or similar functions. The embodiments described with reference to the drawings are exemplary, which are only intended for explaining the principles of the disclosure rather than limiting the protection scope of the present application.

An embodiment of this disclosure propose a new pressure sensor, in which the structures of an organic electroluminescent device is integrated with an elastic composite electrode so as to perform detection of a pressure based on a light emitting parameter of a light emitting layer in the organic electroluminescent device.

In an aspect of the disclosure, a pressure sensor is disclosed. According to an embodiment of this disclosure, referring to FIG. 1, the pressure sensor comprises a first electrode 200, at least two supports 300, an elastic composite electrode 400, a second electrode 500 and an organic light emitting layer 600. The supports 300 are arranged on a first surface of the first electrode 200, and since the supports 300 are spaced apart from each other, the supports 300 cover part of the first surface of the first electrode 200. The elastic composite electrode 400 is arranged on a side of the supports 300 facing away the first electrode 200. The elastic composite electrode 400, two adjacent supports 300 and the first electrode 200 define a compressible space 10, and each support is formed of an insulating material. The second electrode 500 is arranged on a side of the elastic composite electrode 400 facing away the first electrode 200, and the organic light emitting layer 600 is arranged between the first electrode 200 and the second electrode 500 and in contact with one of the first electrode 200 and the second electrode 500. For the example shown in FIG. 1, when the pressure sensor is not subjected to an external pressure, the first electrode and the second electrode in the sensor are in a disconnected state, and the organic light emitting layer 600 does not emit light. When the pressure sensor is subjected to an external pressure, the elastic composite electrode is in contact with the first electrode via the compressible space 10 under the pressure, thereby bringing the first electrode and the second electrode into an electrically connected state. At that time, a voltage applied between the first electrode and the second electrode makes the organic light emitting layer emit light. The light intensity or brightness of the organic light emitting layer are associated with the pressure to which the pressure sensor is subjected, so a change in the pressure can be determined by detecting parameters associated with the light emission of the organic light emitting layer. Thereby, the pressure sensor has advantages such as low power consumption, fast response and high sensitivity. In the example of FIG. 1, the organic light emitting layer 600 can be a continuous layer. Alternatively, the organic light emitting layer 600 may comprise a plurality of sub-light emitting layers independent of each other.

Figure 2:
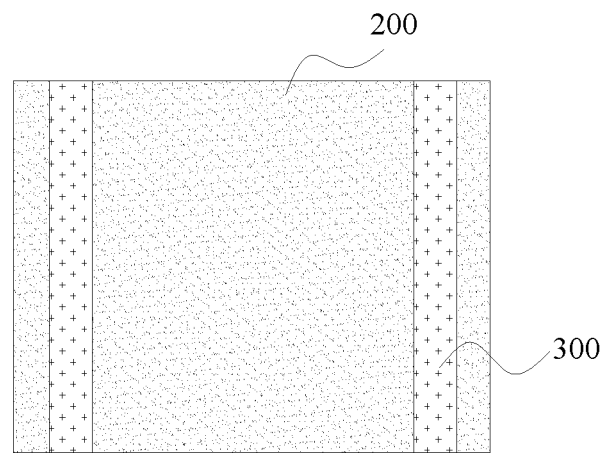
FIG. 2 is a partial lateral section view of a pressure sensor according to an embodiment of this disclosure.

Different embodiments of the pressure sensor will be explained in detail with reference to specific examples of this disclosure. According to an embodiment of this disclosure, the supports 300 are arranged on the first surface of the first electrode 200, and cover part of the first surface of the first electrode 200. The specific shapes of the supports are not specially limited, which can be determined by those skilled in the art according to specific situations. For example, according to some embodiments of this disclosure, referring to a lateral section view of the sensor shown in FIG. 2, each of the supports 300 is in a strip shape and arranged on either of two opposite edges of the first electrode 200, covering part of the surface of the first electrode 200. In this way, a compressible space can be defined between the first electrode 200 and the elastic composite electrode 400 by virtue of the supports 300.

Figure 3:
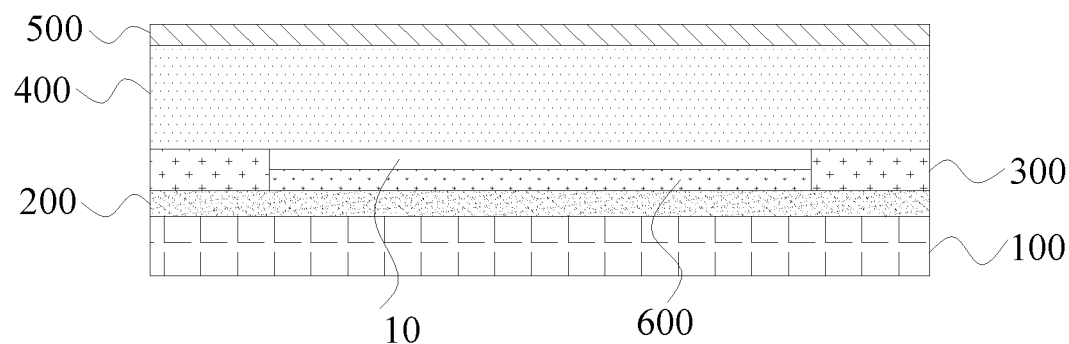
FIG. 3 is a partial longitudinal section view of a pressure sensor according to another embodiment of this disclosure.

According to an embodiment of this disclosure, the organic light emitting layer 600 is arranged between the first electrode 200 and the second electrode 500 and in contact with one of the first electrode 200 and the second electrode 500. The specific position of the organic light emitting layer is not specially limited, and sensors of different structures can be designed by those skilled in the art upon specific situations as long as the above condition is satisfied. For example, according to some embodiments of this disclosure, the organic light emitting layer 600 can be arranged between the elastic composite electrode 400 and the second electrode 500 (the structure as shown in FIG. 1). Thereby, a top pressure sensor can be formed. Alternatively, according to other embodiments of this disclosure, the organic light emitting layer 600 can be arranged on a side of the first electrode 200 facing the compressible space 10 (the structure as shown in FIG. 3). Thereby, a bottom pressure sensor can be formed. According to some embodiments of this disclosure, the pressure sensor further comprises a substrate, e.g., as shown in FIG. 1 or FIG. 3, the substrate 100 is attached to a second surface of the first electrode 200 opposite to the first surface thereof.

Figure 4:
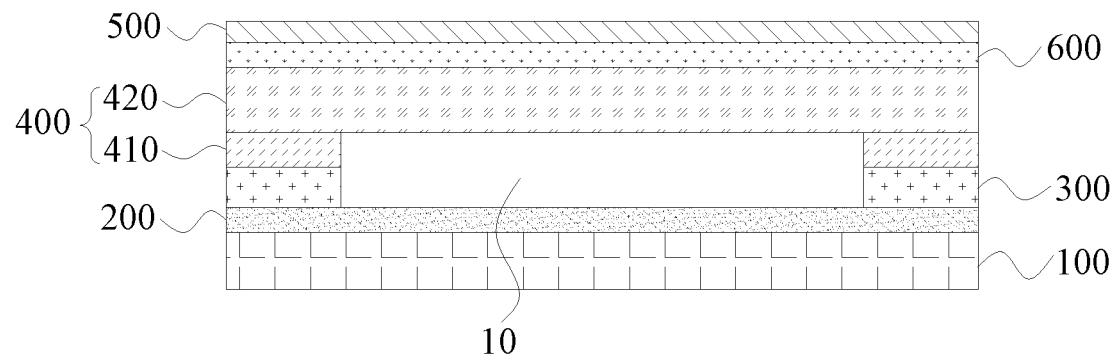
FIG. 4 is a partial longitudinal section view of a pressure sensor according to yet another embodiment of this disclosure.
Figure 5:
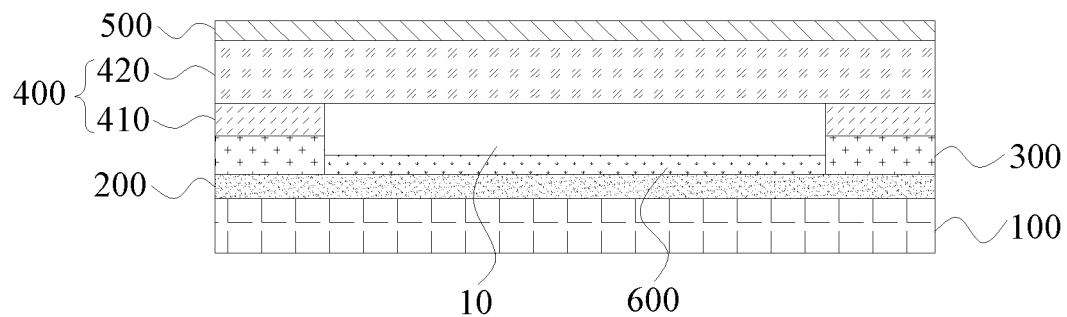
FIG. 5 is a partial longitudinal section view of a pressure sensor according to still another embodiment of this disclosure.

According to an embodiment of this disclosure, referring to FIG. 4 and FIG. 5, the elastic composite electrode 400 comprises a conductive sublayer 410 and a conductive elastic sublayer 420, the conductive sublayer 410 is arranged on a side of the supports 300 facing away the first electrode 200, the conductive elastic sublayer 420 is arranged on a side of the conductive sublayer 410 facing away the supports 300, and the conductive elastic sublayer 420 is a planar structure. The conductive sublayer can enhance the conductivity of the elastic composite electrode, and the conductive elastic sublayer has certain elasticity apart from the conductivity characteristics, which can enhance a deformable degree of the pressure sensor, thereby ensuring that the pressure sensor can rebound to its uncompressed state after the deformation and that the pressure sensor can be used repeatedly.

According to an embodiment of this disclosure, an orthogonal projection of the conductive elastic sublayer 420 on the substrate 100 covers that of the compressible space 10 on the substrate 100 such that the coverage of the conductive elastic sublayer 420 covers the coverage of the compressible space 10, which allows the compressible space 10 to be fully utilized. Furthermore, according to an embodiment of this disclosure, an orthogonal projection of the organic light emitting layer 600 on the substrate 100 and an orthogonal projection of the compressible space 10 on the substrate 100 have an overlapping region. According to some embodiments of this disclosure, both the orthogonal projection of the conductive elastic sublayer 420 on the substrate and the orthogonal projection of the organic light emitting layer 600 on the substrate cover the orthogonal projection of the compressible space on the substrate, such that pressure sensing detection can be achieved as long as any position of the sensor corresponding to the compressible space above the elastic composite electrode is pressed. Specifically, according to an embodiment of this disclosure, for the top pressure sensor shown in FIG. 4, the organic light emitting layer 600 is arranged between the second electrode 500 and the elastic composite electrode 400, and the orthogonal projection of the organic light emitting layer 600 on the substrate 100 overs that of the compressible space 10 on the substrate 100. According to an embodiment of this disclosure, for the bottom pressure sensor shown in FIG. 5, the organic light emitting layer 600 is arranged on a side of the first electrode 200 facing the compressible space 10, and the orthogonal projection of the organic light emitting layer 600 on the substrate 100 overs that of the compressible space 10 on the substrate 100. Thereby, regions above the compressible space can all be used as pressure sensing regions, which is advantageous to improve the pressure sensing effect.

According to an embodiment of this disclosure, the supports 300 are made of an insulating material, and the conductive sublayer 410 comprises a plurality of conductive blocks being in one-to-one correspondence with the supports and separated from each other by the compressible space, i.e., the supports 300 and the conductive blocks of the conductive sublayer 410 are equal in number. According to an embodiment of this disclosure, an orthogonal projection of each conductive block of the conductive sublayer 410 on the substrate falls within an orthogonal projection of a corresponding support 300 on the substrate 100. Thereby, the supports can better support the conductive sublayer, thus facilitating forming a larger compressible space for the deformation of the elastic composite electrode. Specifically, according to an embodiment of this disclosure, as shown in FIG. 4 or FIG. 5, each support 300 covers part of the surface of the first electrode 200, and an orthogonal projection of the conductive sublayer 410 on the first electrode 200 also covers part of the surface of the first electrode 200, and conductive blocks of the conductive sublayer 410 are in one-to-one correspondence with the supports 300. This can provide a larger compressible space for the deformation of the elastic composite electrode and thus improve the sensitivity of the pressure sensor.

Figure 6:
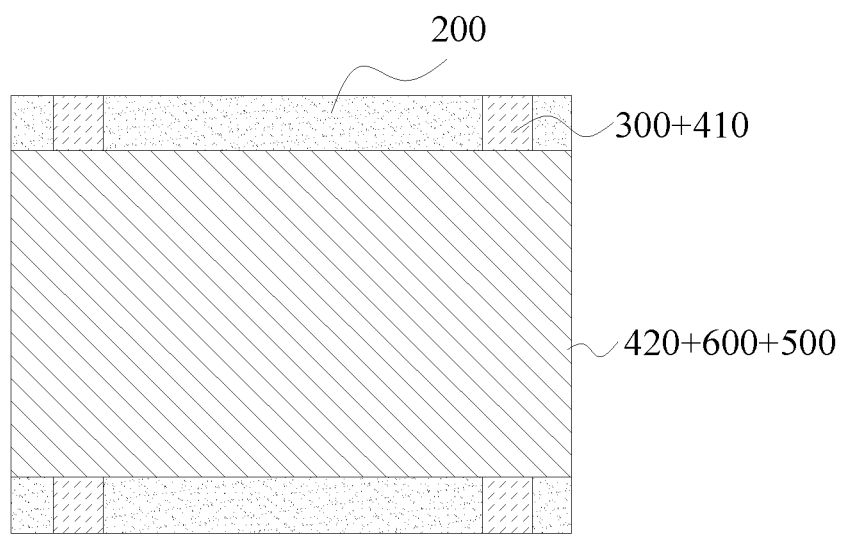
FIG. 6 is a partial lateral section view of a pressure sensor according to another embodiment of this disclosure.

According to an embodiment of this disclosure, referring to the partial cross-section view of a top pressure sensor shown in FIG. 6, the conductive sublayer 410 is arranged on a side of the support 300 facing away the first electrode 200, and an orthogonal projection of the conductive sublayer 410 on the first electrode 200 overlaps that of the supports 300 on the first electrode 200, and each conductive block of the conductive sublayer 410 corresponds to each of the supports 300, respectively, and the conductive elastic sublayer 420 is arranged on a side of the conductive sublayer 410 facing away the supports 300, the organic light emitting layer 600 is arranged on a side of the conductive elastic sublayer 420 facing away the conductive sublayer 410, and the second electrode 500 is arranged on a side of the organic light emitting layer 600 facing away the conductive elastic sublayer 420. Except that the organic light emitting layer 600 is arranged on a side of the first electrode 200 facing the compressible space 10, a bottom pressure sensor has a structure similar to that of the top pressure sensor, which will not be detailed herein for simplicity.

Figure 7:
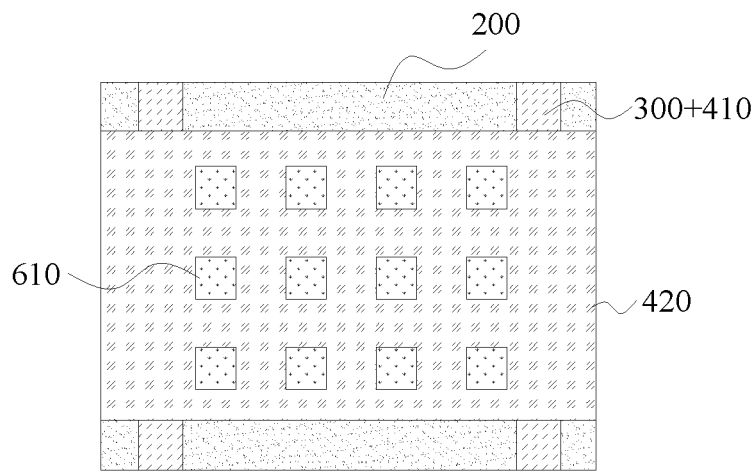
FIG. 7 is a partial lateral section view of the pressure sensor according to yet another embodiment of this disclosure.

According to an embodiment of this disclosure, referring to FIG. 7, the organic light emitting layer 600 comprises a plurality of sub-light emitting layers 610 arranged in an array. Therefore, based on the light emission of the sub-light emitting layers, the value of the pressure applied to the pressure sensor can be determined, and thus detection of the pressure can be achieved. These sub-light emitting layers 610 can be separated from each other, and they are distributed between the first electrode and the second electrode dispersedly. In case the organic light emitting layer comprising a plurality of sub-light emitting layers 610 in an array is applied to the example of the bottom pressure sensor shown in FIG. 3, the magnitude of the external pressure can be evaluated based on a light emitting area of the organic light emitting layer 600. Those skilled in the art can understand that in order to improve the light emitting efficiency of the organic light emitting layer 600, the pressure sensor may further comprise structures such as a hole injection layer, an electron transport layer and a carrier blocking layer, the hole injection layer can be formed of PEDOT: PSS. Both the specific compositions of the above-mentioned structures and the arrangement positions thereof are not particularly limited, and those skilled in the art can choose available materials to form the above structures upon the specific situation of the light emitting layer.

Figure 8:
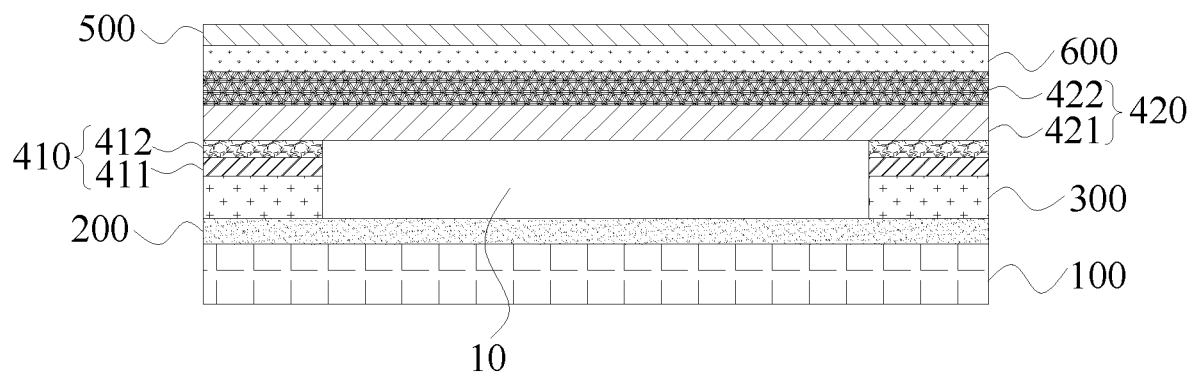
FIG. 8 is a partial longitudinal section view of a pressure sensor according to an embodiment of this disclosure.

According to an embodiment of this disclosure, referring to FIG. 8, the conductive sublayer 410 comprises a first metal layer 411 and a second metal layer 412, the first metal layer 411 is arranged above the supports 300, and the second metal layer 412 is arranged on a side of the first metal layer 411 facing away the supports 300. The first metal layer 411 can be formed of a metal with conductive properties and low resistivity, and the second metal layer 412 can be formed of a metal with good ductility and insignificant changes in resistivity when deformed. That is, the second metal layer 412 only needs to satisfy the requirement of a pressure sensor electrode, and the first metal layer 411 serves as an epitaxial electrode, so the first metal layer and the second metal layer can ensure good conductive properties of the conductive sublayer. As long as the conductivity and the ductility are satisfied, the specific materials of the first metal layer and the second metal layer are not specially limited, which can be determined by those skilled in the art according to specific situations. For example, according to some embodiments of this disclosure, the first metal layer 411 can be made of Cu and Al, and the second metal layer 412 can be made of Ag.

Figure 9:
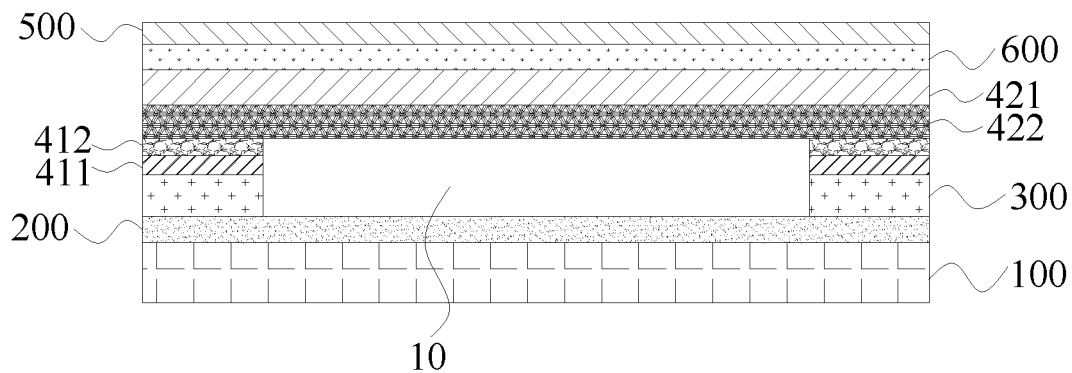
FIG. 9 is a partial longitudinal section view of a pressure sensor according to a further embodiment of this disclosure.

According to an embodiment of the disclosure, the conductive elastic sublayer 420 comprises an elastic layer 421 and a third metal layer 422 stacked on the conductive sublayer, the elastic layer 421 contains a conductive component. This can ensure good elasticity and conductive properties of the conductive elastic sublayer such that the elastic composite electrode can be deformed after being pressed and resume its original state after the pressure is released. The specific positions of the elastic layer and the metal layer are not limited, e.g., in the example of FIG. 8, the elastic layer 421 is arranged on a side of the second metal layer 412 facing away the first metal layer 411, and the third metal layer 422 is arranged on a side of the elastic layer 421 facing away the second metal layer 412. Alternatively, in the example of FIG. 9, the third metal layer 422 is arranged on a side of the second metal layer 412 facing away the first metal layer 411, and the elastic layer 421 is arranged on a side of the third metal layer 422 facing away the second metal layer 412.

The specific materials of the elastic layer and the third metal layer are not specially limited as long as the elastic layer has good elasticity and conductive properties and the third metal layer has good conductive properties. For example, according to some embodiments of this disclosure, the elastic layer 421 comprises at least one of conductive rubber and an elastic polymer containing conductive particles. For example, the host material of the elastic layer 421 may comprise Polystyrene (PS), polymethyl methacrylate (PMMA) or conductive rubber. The metal layer 422 comprises silver nanowires. Thus, it is enables good elasticity and conductive properties of the conductive elastic sublayer.

In order to facilitate understanding, the operation principles of the pressure sensor will be explained briefly.

The pressure sensor according to the embodiments of the disclosure comprises a first electrode, a second electrode, an organic light emitting layer and an elastic composite electrode. The first electrode, the second electrode and the organic light emitting layer may actually constitute a light emitting device. When the pressure sensor receives an external voltage, in case of the absence of an external pressure, the first electrode and the second electrode of the light emitting device are disconnected from each other, and the light emitting device does not emit light. When the pressure sensor is subjected to an external pressure, the first electrode and the second electrode are electrically connected via the elastic composite electrode, and the organic light emitting layer in the light emitting device will emit light or at least part of the sub-light emitting layers will emit light. According to an embodiment of this disclosure, when a top pressure sensor is subjected to a pressure, the conductive elastic sublayer of the elastic composite electrode will be deformed to compress the compressible space and come into contact with the first electrode, such that the external voltage can be applied across the organic light emitting layers via the first electrode and the second electrode, thereby enabling the organic light emitting layers to emit light. When a bottom pressure sensor is subjected to a pressure, the conductive elastic sublayer is deformed to compress the compressible space and come into contact with the organic light emitting layer, such that the first electrode and the second electrode are electrically connected, thereby enabling the organic light emitting layer to emit light under the effect of the external voltage. Specifically, for example, for the example of the top pressure sensor shown in FIG. 1, the organic light emitting layer 600 emits light in response to the external pressure, and the intensity or brightness of the light emission is positively correlated to the magnitude of the external pressure. For the example of the bottom pressure sensor shown in FIG. 3, if the organic light emitting layer 600 is a continuous layer structure, the intensity or brightness of the light emission of the organic light emitting layer is positively correlated to the magnitude of the external pressure, and in case the organic light emitting layer 600 comprises a plurality of sub-light emitting layers independent of each other, only some region of the organic light emitting layer may emit light under the external pressure, and the area of the light emitting region (or the number of the sub-light emitting layers emitting light), and the intensity or brightness of the light emitting region are positively correlated to the magnitude of the external pressure. Therefore, changes in the pressure can be obtained by measuring light emitting parameters (e.g., light emitting brightness, light emitting area, current efficiency and so on) of the light emitting device.

In another aspect, a method for manufacturing a pressure sensor is disclosed, and the pressure sensor manufactured by using this method can be the pressure sensor according to the above embodiments. That is, the pressure sensor fabricated with this method can have all features and advantages of the pressure sensor discussed above, which will not be repeated herein for simplicity.

For the sensor pressure shown in FIG. 1, the manufacturing method may comprise the following steps.

Firstly, arranging a first electrode on a substrate, and then arranging supports on a side of the first electrode facing away the substrate. How to fabricate the first electrode is not specially limited, e.g., it can be formed by means, including but not limited to, metal sputtering. The supports can be formed by coating a material capable of providing support, e.g., a glue wall is formed on the first electrode and then subjected to a patterning process.

Subsequently, forming an elastic composite electrode, and forming an organic light emitting layer on a side of the elastic composite electrode facing away the first electrode, and arranging a second electrode on a side of the organic light emitting layer facing away the elastic composite electrode. How to form the organic light emitting layer and the second electrode are not specially limited, e.g., those skilled in the art can form the organic light emitting layer in any suitable way that is known, and then form the second electrode on the organic light emitting layer. The second electrode can be formed either in the same way as the first electrode, or in a different way, as long as an electrode with conductive properties satisfying the requirement of the organic light emitting device can be formed and the function of the organic light emitting layer is not affected.

According to an embodiment of this disclosure, forming the elastic composite electrode may comprise the following processes: firstly, forming a first metal layer on a side of the supports facing away the first electrode, and arranging a second metal layer on a side of the first metal layer facing away the supports so as to form a conductive sublayer. Subsequently, attaching an elastic layer having a conductive component to the substrate, and coating and drying a third metal layer on a side of the elastic layer facing away the substrate so as to form a conductive elastic sublayer. Finally, peeling and transferring the elastic layer and the third metal layer to the second metal layer. In this way, the conductive elastic sublayer can be easily transferred to the conductive sublayer (including the first metal layer and the second metal layer), and thus the pressure sensor can be easily obtained.

Figure 10:
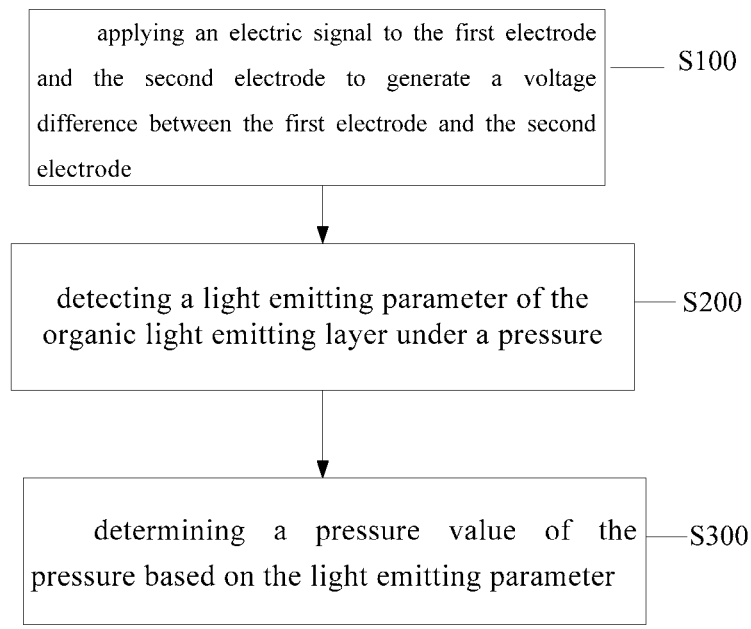
FIG. 10 is a flow chart showing a method of sensing pressure with the pressure sensor according to an embodiment of this disclosure.

In yet another aspect of this disclosure, a display device is disclosed, the display device comprising the pressure sensor described in any of the above embodiments, and therefore the display device has all features and advantages of the pressure sensor described above, which will not be repeated herein for simplicity. In still another aspect, this disclosure provides a method for pressure sensing. According to an embodiment of this disclosure, the method performs pressure sensing by using the pressure sensor described above, referring to FIG. 10, the method comprises the following steps.

S100: applying an electric signal to the first electrode and the second electrode to generate a voltage difference between the first electrode and the second electrode.

S200: detecting a light emitting parameter of the organic light emitting layer under pressure.

According to an embodiment of this disclosure, the light emitting parameter comprises at least one of brightness, light emitting area and current efficiency of the organic light emitting layer. As mentioned above, for both the top pressure sensor and the bottom pressure sensor, the brightness of the light emission of the organic light emitting layer is positively correlated to the pressure to which the pressure sensor is subjected, so a relationship between the light emitting brightness of the organic light emitting layer and the external pressure can be established. Based on that, when an unknown external pressure is sensed, the light emitting brightness of the organic light emitting layer can be detected, and the magnitude of the unknown external pressure can be obtained from the relationship between the light emitting brightness of the organic light emitting layer and the external pressure. As another example, for the example of the sensor shown in FIG. 3, when the organic light emitting layer comprises a plurality of sub-light emitting layers independent of each other, the number of the sub-light emitting layers emitting light is positively correlated to the magnitude of the applied pressure, so the magnitude of the applied external pressure can be determined based on the number of the sub-light emitting layers emitting light (i.e., the light emitting area) in the organic light emitting layer. In case the organic light emitting layer comprises a plurality of sub-light emitting layers independent of each other, the light emitting area can be represented indirectly by using another parameter, e.g., a ratio of the number of the sub-light emitting layers emitting light to the total number of the sub-light emitting layers. For the bottom pressure sensor shown in FIG. 3, the organic light emitting layer comprises a plurality of sub-light emitting layers arranged in an array, and as mentioned above, the number of the sub-light emitting layers emitting light varies under different pressures, and the greater the pressure is, the more the sub-light emitting layers are. Therefore, the pressure to which the pressure sensor is subjected is positively proportional to the number of the sub-light emitting layers emitting light. It can be understood that operation parameters for a single sub-light emitting layer emitting light among the plurality of sub-light emitting layers arranged in an array in the light emitting layer of the sensor can be obtained, and the operation parameters herein can comprise any parameter well known for those skilled in the art that can be detected for an organic light emitting device, such as current density, current efficiency and light emitting efficiency. Therefore, by detecting an operation parameter of the entire sensor when the organic light emitting layer emits light under an external pressure, the number of the sub-light emitting layers emitting light under the pressure can be determined.

S300: determining a pressure value of the pressure based on the light emitting parameter.

The principle of determining the pressure value based on the light emitting parameter will be explained briefly by taking the pressure sensor of FIG. 1 as an example. According to the embodiment of the sensor of FIG. 1, when the pressure sensor is not subjected to an external pressure, the first electrode and the second electrode are insulated from each other by means of the supports and the compressible space, and when the pressure sensor is subjected to an external pressure, the elastic composite electrode is deformed to come into contact with the first electrode, such that the first electrode and the second electrode are electrically connected, thereby enabling the organic light emitting layer to emit light under a voltage between the first electrode and the second electrode. It can be understood that different degrees of contact between the elastic composite electrode and the first electrode may result in different resistance values between the first electrode and the second electrode. The greater the applied external pressure is, the larger the contact area between the elastic composite electrode and the first electrode is, and the smaller the resistance between the first electrode and the second electrode is. On the contrary, the smaller the applied external pressure is, the smaller the contact area between the elastic composite electrode and the first electrode is, and the greater the resistance between the first electrode and the second electrode is. Therefore, if the voltage difference between the first electrode and the second electrode is constant, different external pressures would result in different brightnesses and current efficiencies of the organic light emitting layer 600. Accordingly, the magnitude of the pressure value applied can be determined based on the detected brightness or current efficiency (which is a ratio of brightness to current density).

Figure 11:
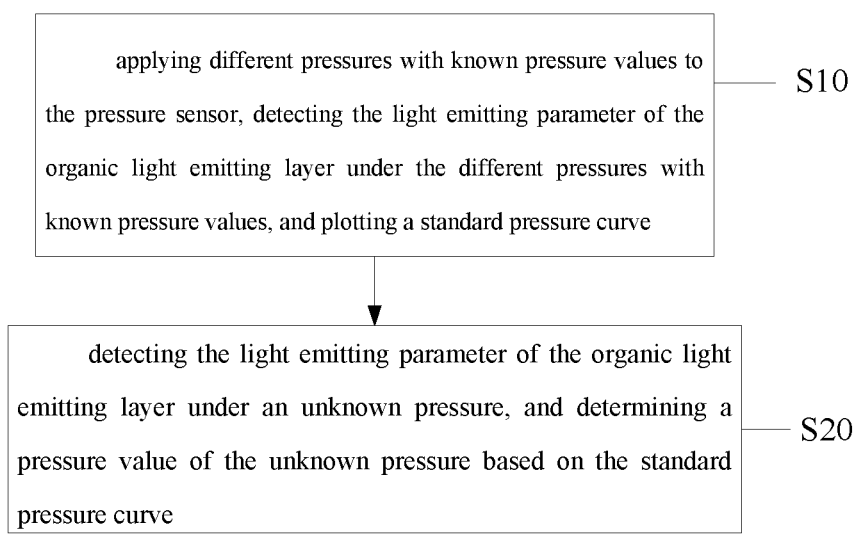
FIG. 11 is a flow chart of determining a pressure value of a pressure based on a light emitting parameter according to another embodiment of this disclosure.

According to an embodiment of this disclosure, referring to FIG. 11, determining a pressure value of the pressure based on the light emitting parameter can comprise the following steps.

S10: applying different pressures with known pressure values to the pressure sensor, detecting the light emitting parameters of the organic light emitting layer under the different pressures with known pressure values, and plotting a standard pressure curve, the standard pressure curve indicating a relationship between the light emitting parameter and the pressure value of the pressure applied to the pressure sensor. The standard pressure curve can be a curve showing a relationship between brightness and pressure value, a curve showing a relationship between light emitting area and pressure value, a curve showing a relationship between current efficiency and pressure value and so on.

S20: obtaining a light emitting parameter of the organic light emitting layer under an unknown pressure, and determining a pressure value of the unknown pressure based on the standard pressure curve.

When an unknown pressure is applied to the pressure sensor, a relevant light emitting parameter can be obtained through instrument measurement (or further calculation), and a value of the pressure under this light emitting parameter can be obtained easily by inquiring the standard pressure curve obtained previously with the light emitting parameter.

In the description of this disclosure, orientational or positional relationships indicated by terms such as "up", "above", "below" and "down" are based on the drawings. They are used only for facilitating description of this disclosure, rather than requiring the embodiments of this disclosure to be constructed and operated in a specific orientation, so they cannot be understood as limiting the protection scope of this disclosure.

In the description of this specification, descriptions with reference to terms such as "an embodiment" and "another embodiment" mean that specific features, structures, materials or characteristics described by the embodiment are comprised in at least one embodiment of this disclosure. Schematic expressions of the above terms are not necessarily directed at the same embodiment or example herein. Moreover, the described specific features, structures, materials or characteristics can be combined suitably in any one or more embodiments or examples. Besides, where no contradiction is introduced, those skilled in the art can combine and assemble different embodiments or examples described herein with features of different embodiments or examples. In addition, terms of "first" and "second" are only used herein for descriptive purposes and should not be construed as indicating or implying relative importance or hinting at the number of the indicated technical features.

Although the embodiments of this disclosure have been shown and described, it can be understood that the embodiments are exemplary and cannot be construed as limiting the protection scope of the application, and one having ordinary skills in the art can modify, substitute and vary the above embodiments without departing the scope of this disclosure. These modifications, substitutions and variations do not deviate from the essence of the principles or spirits of the invention explained in this disclosure, and fall within the protection scope of the present application.

The invention claimed is:

1. A pressure sensor, comprising:
a first electrode;
at least two supports on a first surface of the first electrode;
an elastic composite electrode on a surface of the at least two supports facing away from the first electrode, wherein two adjacent supports of the at least two supports, wherein the elastic composite electrode and the first electrode define a compressible space, and wherein the at least two supports comprise an insulating material;
a second electrode on a surface of the elastic composite electrode facing away from the first electrode; and
an organic light emitting layer between the first electrode and the second electrode,
wherein the organic light emitting layer is in contact with one of the first electrode or the second electrode,
wherein the elastic composite electrode is configured to electrically connect the first electrode with the second electrode in response to the pressure sensor being subjected to an external pressure, enabling the organic light emitting layer to emit light,
wherein the elastic composite electrode comprises:
a conductive sublayer on the surface of the at least two supports facing away from the first electrode, and
a conductive elastic sublayer on a surface of the conductive sublayer facing away from the at least two supports,
wherein the conductive elastic sublayer comprises an elastic layer and a third metal layer stacked on the conductive sublayer, the elastic layer is between the third metal layer and the conductive sublayer, and the elastic layer comprises a conductive component.

2. The pressure sensor according to claim 1,
wherein the pressure sensor comprises a substrate,
wherein the substrate is attached to a second surface of the first electrode opposite to the first surface,
wherein an orthogonal projection of the conductive elastic sublayer on the substrate overlaps an orthogonal projection of the compressible space on the substrate.

3. The pressure sensor according to claim 2, wherein an orthogonal projection of the organic light emitting layer on the substrate at least partially overlaps the orthogonal projection of the compressible space on the substrate.

4. The pressure sensor according to claim 2, wherein the conductive sublayer comprises a plurality of conductive blocks in one-to-one correspondence with the at least two supports and separated by the compressible space.

5. The pressure sensor according to claim 4, wherein an orthogonal projection of each conductive block of the plurality of conductive blocks on the substrate is within an orthogonal projection of a corresponding support on the substrate.

6. The pressure sensor according to claim 1, wherein the conductive sublayer further comprises:
a first metal layer above the at least two supports, and
a second metal layer on a surface of the first metal layer facing away from the at least two supports.

7. The pressure sensor according to claim 1, wherein the elastic layer comprises at least one selected from a group consisting of a conductive rubber and an elastic polymer including conductive particles, the third metal layer comprises silver nanowires.

8. The pressure sensor according to claim 1, wherein the organic light emitting layer comprises a plurality of sub-light emitting layers in an array.

9. The pressure sensor according to claim 1, wherein the organic light emitting layer is between the elastic composite electrode and the second electrode.

10. The pressure sensor according to claim 1,
wherein the organic light emitting layer is on a surface of the first electrode facing the compressible space, and
wherein the organic light emitting layer comprises a plurality of sub-light emitting layers in an array.

11. A display device, comprising the pressure sensor according to claim 1.

12. A method for manufacturing the pressure sensor according to claim 1, wherein the elastic composite electrode comprises a conductive sublayer and a conductive elastic sublayer arranged in a stack, and wherein the method comprises:
forming the conductive sublayer on a surface of the at least two supports facing away from the first electrode, and
forming the conductive elastic sublayer on a substrate, peeling and transferring the conductive elastic sublayer to the conductive sublayer.

13. The method according to claim 12, wherein the forming the conductive sublayer comprises:
fabricating a first metal layer on the surface of the at least two supports facing away from the first electrode; and forming a second metal layer on a surface of the first metal layer facing away from the supports;
wherein the forming the conductive elastic sublayer comprises:
attaching an elastic layer comprising a conductive component to the substrate;
coating and drying a third metal layer on a surface of the elastic layer facing away from the substrate; and
peeling and transferring the elastic layer and the third metal layer to the second metal layer.

14. The display device according to claim 11, wherein the elastic composite electrode comprises:
a conductive sublayer on the surface of the at least two supports facing away from the first electrode; and
a conductive elastic sublayer on a surface of the conductive sublayer facing away from the at least two supports,
wherein the conductive elastic sublayer comprises a planar structure.

15. The display device according to claim 14,
wherein the pressure sensor comprises a substrate,
wherein the substrate is attached to a second surface of the first electrode opposite to the first surface, and
wherein an orthogonal projection of the conductive elastic sublayer on the substrate overlaps an orthogonal projection of the compressible space on the substrate.

16. The display device according to claim 15, wherein an orthogonal projection of the organic light emitting layer on the substrate comprises an overlapping region with the orthogonal projection of the compressible space on the substrate.

17. A method for sensing a pressure with the pressure sensor according to claim 1, comprising:
applying an electric signal to the first electrode and the second electrode to generate a voltage difference between the first electrode and the second electrode;
detecting a light emitting parameter of the organic light emitting layer under the pressure, the light emitting parameter comprising at least one selected from a group consisting of brightness, light emitting area and current efficiency of the organic light emitting layer; and
determining a pressure value of the pressure based on the light emitting parameter.

18. The method according to claim 17, wherein the determining the pressure value of the pressure based on the light emitting parameter comprises:
applying a plurality of known pressures to the pressure sensor;
detecting the light emitting parameter of the organic light emitting layer under the plurality of known pressures;
plotting a standard pressure curve, the standard pressure curve indicating a relationship between the light emitting parameter and the pressure value of the pressure applied to the pressure sensor; and
detecting the light emitting parameter of the organic light emitting layer under an unknown pressure; and
determining the pressure value of the unknown pressure based on the standard pressure curve.

* * * * *

UNITED STATES PATENT AND TRADEMARK OFFICE
CERTIFICATE OF CORRECTION

| | | |
|---|---|---|
| PATENT NO. | : 11,698,316 B2 | |
| APPLICATION NO. | : 16/649502 | |
| DATED | : July 11, 2023 | |
| INVENTOR(S) | : Peng et al. | |

It is certified that error appears in the above-identified patent and that said Letters Patent is hereby corrected as shown below:

On the Title Page

(73) Assignees: Please remove Hefei Xinsheng Optoelectronics Technology Co., Ltd., Anhui(CN) and replace with Hefei Xinsheng Optoelectronics Technology Co., Ltd., Hefei Anhui(CN)

Signed and Sealed this
Eighth Day of August, 2023

Katherine Kelly Vidal
*Director of the United States Patent and Trademark Office*